(12) United States Patent
Ngo et al.

(10) Patent No.: US 11,424,779 B2
(45) Date of Patent: *Aug. 23, 2022

(54) HETEROGENEOUS BUS BRIDGE CIRCUIT AND RELATED APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/414,007

(22) Filed: May 16, 2019

(65) Prior Publication Data

US 2020/0151125 A1    May 14, 2020

Related U.S. Application Data

(60) Provisional application No. 62/757,448, filed on Nov. 8, 2018.

(51) Int. Cl.
| | |
|---|---|
| *G06F 13/20* | (2006.01) |
| *G06F 13/40* | (2006.01) |
| *H04B 1/3805* | (2015.01) |
| *H04B 1/401* | (2015.01) |
| *H04B 1/04* | (2006.01) |
| *H04B 1/40* | (2015.01) |

(52) U.S. Cl.
CPC ........... *H04B 1/3805* (2013.01); *G06F 13/20* (2013.01); *G06F 13/4027* (2013.01); *H04B 1/04* (2013.01); *H04B 1/401* (2013.01); *H04B 1/40* (2013.01)

(58) Field of Classification Search
None
See application file for complete search history.

(56) References Cited

U.S. PATENT DOCUMENTS

| | | | |
|---|---|---|---|
| 10,049,026 B2* | 8/2018 | Ngo | G06F 1/26 |
| 10,176,130 B2* | 1/2019 | Ngo | G06F 13/404 |

(Continued)

OTHER PUBLICATIONS

'BGSA141MN10 Low Resistance Antenna Aperture Switch' Data Sheet from Infineon, Jun. 12, 2017. (Year: 2017).*

(Continued)

*Primary Examiner* — Steven G Snyder
(74) *Attorney, Agent, or Firm* — Withrow & Terranova, P.L.L.C.

(57) ABSTRACT

A heterogeneous bus bridge circuit and related apparatus are provided. The heterogeneous bus bridge circuit is configured to bridge a radio frequency front-end (RFFE) bus with a number of auxiliary buses that are different from the RFFE bus. Each of the auxiliary buses may support a fixed number of slaves identified respectively by a unique slave identification (USID). In examples discussed herein, the heterogeneous bus bridge circuit can be configured to selectively activate an auxiliary bus for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

20 Claims, 9 Drawing Sheets

(56) References Cited

U.S. PATENT DOCUMENTS

| | | | |
|---|---|---|---|
| 10,185,683 B2 * | 1/2019 | Ngo | G06F 13/4278 |
| 10,198,384 B2 * | 2/2019 | Ngo | G06F 13/364 |
| 10,282,269 B2 * | 5/2019 | Ngo | H04L 1/0045 |
| 10,437,772 B2 * | 10/2019 | Ngo | G06F 13/4282 |
| 10,528,502 B2 * | 1/2020 | Ngo | G06F 1/10 |
| 10,540,226 B2 * | 1/2020 | Ngo | G06F 1/10 |
| 10,579,128 B2 * | 3/2020 | Ngo | G06F 1/3287 |
| 10,579,580 B2 * | 3/2020 | Ngo | G06F 13/4018 |
| 10,635,630 B2 * | 4/2020 | Mishra | G06F 13/4282 |
| 10,698,847 B2 * | 6/2020 | Ngo | G06F 13/364 |
| 10,707,911 B2 * | 7/2020 | Ngo | G06F 13/4027 |
| 10,983,942 B1 * | 4/2021 | Ngo | H04L 12/403 |
| 11,119,958 B2 * | 9/2021 | Ngo | G06F 13/362 |
| 2008/0046603 A1 | 2/2008 | Kobayashi et al. | |
| 2012/0179922 A1 | 7/2012 | Mehrotra et al. | |
| 2014/0304442 A1 | 10/2014 | Hietala et al. | |
| 2015/0019782 A1 * | 1/2015 | Decesaris | G06F 13/4068 |
| | | | 710/300 |
| 2015/0149673 A1 | 5/2015 | Balkan et al. | |
| 2015/0169482 A1 * | 6/2015 | Ngo | G06F 13/3625 |
| | | | 710/110 |
| 2015/0192974 A1 * | 7/2015 | Ngo | G06F 13/4072 |
| | | | 713/322 |
| 2015/0193297 A1 | 7/2015 | Ngo et al. | |
| 2015/0193298 A1 | 7/2015 | Ngo et al. | |
| 2015/0193321 A1 * | 7/2015 | Ngo | G06F 11/221 |
| | | | 714/758 |
| 2015/0193373 A1 * | 7/2015 | Ngo | G06F 13/4291 |
| | | | 710/110 |
| 2017/0199832 A1 * | 7/2017 | Mishra | G06F 13/4282 |
| 2017/0255250 A1 * | 9/2017 | Ngo | G06F 13/4282 |
| 2017/0255578 A1 * | 9/2017 | Ngo | G06F 13/404 |
| 2017/0255579 A1 * | 9/2017 | Ngo | G06F 13/404 |
| 2017/0277651 A1 | 9/2017 | Ngo et al. | |
| 2017/0286340 A1 * | 10/2017 | Ngo | G06F 13/4282 |
| 2018/0234383 A1 | 8/2018 | Daugherty et al. | |
| 2019/0236042 A1 | 8/2019 | O'Shea et al. | |
| 2020/0050575 A1 * | 2/2020 | Mishra | G06F 13/4282 |
| 2020/0081859 A1 * | 3/2020 | Mishra | G06F 13/3625 |
| 2020/0083875 A1 * | 3/2020 | Mishra | H03K 5/003 |
| 2020/0151131 A1 | 5/2020 | Ngo et al. | |
| 2020/0153470 A1 * | 5/2020 | Ngo | G06F 13/4027 |
| 2020/0334185 A1 * | 10/2020 | Ngo | G06F 13/4027 |

OTHER PUBLICATIONS

'MIPI Alliance Specification for RF Front-End Control Interface' version 1.10, Jul. 26, 2011. (Year: 2011).*

'MIPI RFFE v2.0 Webinar: An Overview of New Features and Implementation Benefits' by Ross and Oakley, Feb. 17, 2015. (Year: 2015).*

'Inside MIPI RFFE v2.1: Enabling the 5G transformation' by Jim Ross & Victor Wilkerson, Apr. 30, 2018. (Year: 2018).*

'Unification in the RF front-end : the new MIPI standard' by Wilkerson and Hueber, EE Times, Nov. 8, 2010. (Year: 2010).*

Final Office Action for U.S. Appl. No. 16/430,617, dated Oct. 7, 2020, 19 pages.

Non-Final Office Action for U.S. Appl. No. 16/391,646, dated Sep. 27, 2019, 14 pages.

Non-Final Office Action for U.S. Appl. No. 16/430,617, dated Dec. 28, 2020, 18 pages.

Notice of Allowance for U.S. Appl. No. 16/391,646, dated Mar. 5, 2020, 8 pages.

Non-Final Office Action for U.S. Appl. No. 16/430,617, dated Jun. 1, 2020, 19 pages.

Notice of Allowance for U.S. Appl. No. 16/430,617, dated Jul. 9, 2021, 7 pages.

* cited by examiner (1)

HETEROGENEOUS BUS BRIDGE CIRCUIT AND RELATED APPARATUS

RELATED APPLICATIONS

This application claims the benefit of U.S. provisional patent application Ser. No. 62/757,448, filed on Nov. 8, 2018, the disclosure of which is incorporated herein by reference in its entirety.

FIELD OF THE DISCLOSURE

The technology of the disclosure relates generally to a heterogeneous bus hub configured to bridge different communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may be first modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1 (hereinafter referred to as "RFFE specification").

In this regard, FIG. 1 is a schematic diagram of an exemplary RFFE bus structure 10 as defined in the RFFE specification. The RFFE bus structure 10 includes an RFFE master 12 coupled to a number of RFFE slaves 14(1)-14(N) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively.

Further according to the RFFE specification, each of the RFFE slaves 14(1)-14(N) is required to have a unique slave identification (USID) and the RFFE bus structure 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(N). According to the RFFE specifications, each of the RFFE slaves 14(1)-14(N) is assigned one of the 15 USIDs by a system integrator. Accordingly, in the RFFE bus structure 10, it is possible to connect up to 15 RFFE slaves 14(1)-14(15) to the RFFE master 12 via the RFFE bus 16.

The RFFE specification also allows any of the 15 USIDs being used as a group slave identification (GSID) to identify an RFFE slave group. For example, the RFFE bus structure includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(N) if any of the 15 USIDs is used to represent a GSID.

The RFFE master 12 is configured to communicate with the RFFE slaves 14(1)-14(N) based on RFFE command sequences (e.g. register-write command sequence, register-read command sequence, trigger command sequence, etc.). According to the RFFE specification, only the RFFE master 12 can initiate an RFFE command sequence on the RFFE bus 16.

Each of the RFFE command sequences can be associated with a USID, a GSID, or a BSID. When an RFFE command sequence is communicated based on a specific USID, the RFFE command sequence is addressed to a specific RFFE slave among the RFFE slaves 14(1)-14(N) that is identified by the specific USID. When an RFFE command sequence is communicated based on a specific GSID, the RFFE command sequence is addressed to respective RFFE slaves among the RFFE slaves 14(1)-14(N) associated with the specific GSID. For example, if the command sequence is communicated with GSID 0x6, then the command sequence will be addressed to the RFFE slaves associated with the GSID of 0x6. When an RFFE command sequence is communicated based on the BSID, all of the RFFE slaves 14(1)-14(N) on the RFFE bus 16 will be able to receive the RFFE command sequence.

Notably, not all communications require a two-wire serial bus like the RFFE bus 16. In some cases, a single-wire serial bus operating at a slower data rate may be sufficient or even desired for carrying out certain types of communications between circuits. As such, it may be possible to provide a single-wire bus, either concurrent to or independent of, the RFFE bus 16 in a wireless communication device. Further, it may also be desired to make the single-wire bus compatible with the RFFE bus 16.

SUMMARY

Aspects disclosed in the detailed description include a heterogeneous bus bridge circuit and related apparatus. The heterogeneous bus bridge circuit is configured to bridge a radio frequency front-end (RFFE) bus with a number of auxiliary buses that are different from the RFFE bus. In this regard, the heterogeneous bus bridge circuit may be configured to perform command conversion and/or data buffering to facilitate communications between the RFFE bus and the auxiliary buses. Each of the auxiliary buses may support a fixed number of slaves identified respectively by a unique slave identification (USID). In examples discussed herein, the heterogeneous bus bridge circuit can be configured to selectively activate an auxiliary bus for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

In one aspect, a heterogeneous bus bridge circuit is provided. The heterogeneous bus bridge circuit includes a primary port coupled to an RFFE master via an RFFE bus.

The heterogeneous bus bridge circuit also includes at least one first auxiliary port coupled to at least one first slave via at least one first auxiliary bus. The heterogeneous bus bridge circuit also includes at least one second auxiliary port coupled to at least one second slave via at least one second auxiliary bus. The heterogeneous bus bridge circuit also includes a bridge controller. The bridge controller is configured to receive a predefined RFFE command sequence corresponding to the heterogeneous bus bridge circuit and configured to identify at least one selected auxiliary bus among the at least one first auxiliary bus and the at least one second auxiliary bus for communication with the RFFE master. The bridge controller is also configured to activate at least one selected auxiliary port coupled to the at least one selected auxiliary bus among the at least one first auxiliary port and the at least one second auxiliary port in response to receiving the predefined RFFE command sequence.

In another aspect, an apparatus is provided. The apparatus includes an RFFE bus and an RFFE master coupled to the RFFE bus. The apparatus also includes at least one first auxiliary bus and a number of first slaves coupled to the at least one first auxiliary bus. The apparatus also includes at least one second auxiliary bus and a number of second slaves coupled to the at least one second auxiliary bus. The apparatus also includes a heterogeneous bus bridge circuit. The heterogeneous bus bridge circuit includes a primary port coupled to the RFFE master via the RFFE bus. The heterogeneous bus bridge circuit also includes at least one first auxiliary port coupled to the first slaves via the at least one first auxiliary bus. The heterogeneous bus bridge circuit also includes at least one second auxiliary port coupled to the second slaves via the at least one second auxiliary bus. The heterogeneous bus bridge circuit also includes a bridge controller. The bridge controller is configured to receive a predefined RFFE command sequence corresponding to the heterogeneous bus bridge circuit and configured to identify at least one selected auxiliary bus among the at least one first auxiliary bus and the at least one second auxiliary bus for communication with the RFFE master. The bridge controller is also configured to activate at least one selected auxiliary port coupled to the at least one selected auxiliary bus among the at least one first auxiliary port and the at least one second auxiliary port in response to receiving the predefined RFFE command sequence.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
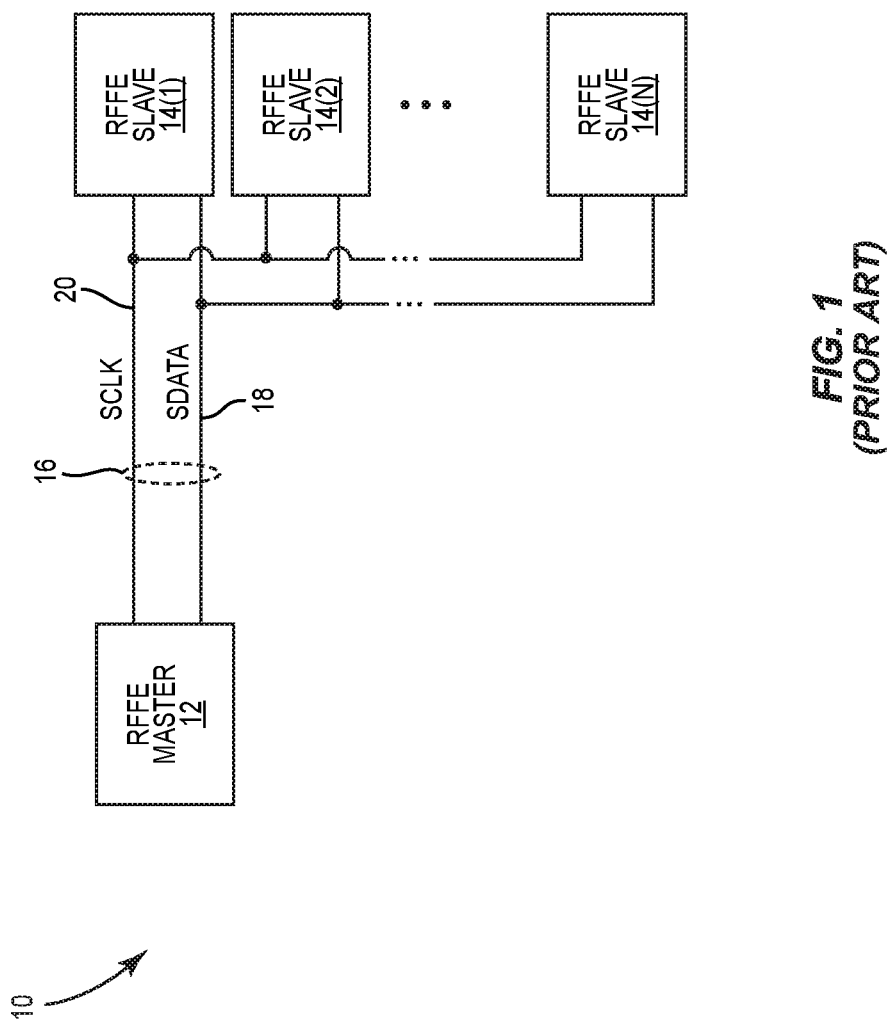
FIG. 1 is a schematic diagram of an exemplary radio frequency front-end (RFFE) bus structure as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a heterogeneous bus bridge circuit and related apparatus. The heterogeneous bus bridge circuit is configured to bridge a radio frequency front-end (RFFE) bus with a number of auxiliary buses that are different from the RFFE bus. In this regard, the heterogeneous bus bridge circuit may be configured to perform command conversion and/or data buffering to facilitate communications between the RFFE bus and the auxiliary buses. Each of the auxiliary buses may support a fixed number of slaves identified respectively by a unique slave identification (USID). In examples discussed herein, the heterogeneous bus bridge circuit can be configured to selectively activate an auxiliary bus for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

Figure 2:
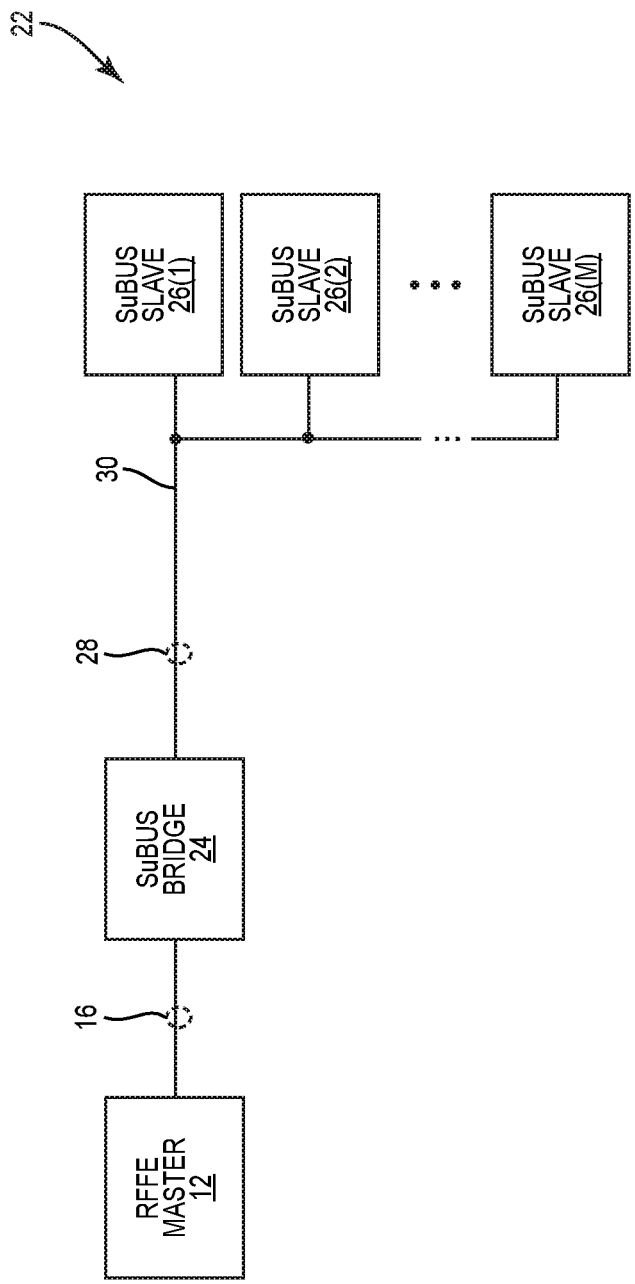
FIG. 2 is a schematic diagram of an exemplary single-wire bus (SuBUS) apparatus in which a SuBUS bridge circuit is configured to bridge communications between an RFFE master in the RFFE bus structure of FIG. 1 with a SuBUS slave(s) in the SuBUS apparatus.

Before discussing the heterogeneous bus bridge circuit and the related RFFE apparatus of the present disclosure, an introduction of a single-wire bus (SuBUS) apparatus is first provided with reference to FIG. 2 to help understand the communities and differences between a SuBUS and the RFFE bus 16 in FIG. 1. The discussion of specific exemplary aspects of a heterogeneous bus bridge circuit of the present disclosure starts below with reference to FIG. 3.

In this regard, FIG. 2 is a schematic diagram of an exemplary SuBUS apparatus 22 in which a SuBUS bridge circuit 24 is configured to bridge communications between the RFFE master 12 in FIG. 1 with one or more SuBUS slaves 26(1)-26(M). Common elements between FIGS. 1 and 2 are shown therein with common element numbers and will not be re-described herein.

The SuBUS bridge circuit 24 is coupled to the SuBUS slaves 26(1)-26(M) over a SuBUS 28 having a single data wire 30. The SuBUS bridge circuit 24 may be coupled to the RFFE master 12 via the RFFE bus 16. In this regard, the SuBUS bridge circuit 24 and the SuBUS slaves 26(1)-26(M) are also RFFE slaves, such as the RFFE slaves 14(1)-14(N), to the RFFE master 12 in the RFFE bus structure 10 of FIG. 1. In this regard, the SuBUS bridge circuit 24 and the SuBUS slaves 26(1)-26(M) are configured to be identified by the RFFE master 12 based on the fifteen (15) USIDs ranging from hexadecimal value 0x1 to hexadecimal value 0xF (0x1-0xF).

Notably, the SuBUS 28 differs from the RFFE bus 16 in several aspects. First, the RFFE bus 16 includes the data line 18 and the clock line 20, while the SuBUS 28 includes only the single data wire 30. Second, the SuBUS bridge circuit 24 is configured to communicate with the SuBUS slaves 26(1)-26(M) based on SuBUS command sequences, which may be compatible but different from the RFFE command sequences communicated over the RFFE bus 16. In this regard, the SuBUS bridge circuit 24 may perform command conversion between the RFFE command sequences and the SuBUS command sequences to facilitate communications between the RFFE bus 16 and the SuBUS 28. Third, the RFFE bus 16 may be configured to operate at a first data rate and the SuBUS 28 may be configured to operate at a second data rate slower than the first data rate. In this regard, the SuBUS bridge circuit 24 may buffer SuBUS data payloads prior to communicating over the RFFE bus 16 to help compensate for a difference between the first data rate and the second data rate. For more detailed information related to the SuBUS apparatus 22 of FIG. 2, please refer to U.S. Pat. No. 10,185,683 B2, entitled "BUS INTERFACE SYSTEM," U.S. Patent Application Publication Number 2015/0193298 A1, entitled "WRITE TECHNIQUE FOR A BUS INTERFACE SYSTEM," and U.S. Patent Application Publication Number 2015/0193297 A1, entitled "READ TECHNIQUE FOR A BUS INTERFACE SYSTEM," the disclosures of which are incorporated herein by reference in their entireties.

Similar to the RFFE slaves 14(1)-14(N) in FIG. 1, the SuBUS bridge circuit 24 and the SuBUS slaves 26(1)-26(M) need to be respectively identified by a USID. As discussed in FIG. 1, the RFFE bus structure 10 can support fifteen (15) USIDs between hexadecimal value 0x1 and hexadecimal value 0xF (0x1-0xF). In this regard, the SuBUS bridge circuit 24 can be identified by a specially assigned USID among the 15 available USIDs and the SuBUS slaves 26(1)-26(M) can be identified by the remaining 14 USIDs excluding the specially assigned USID. For example, if the SuBUS bridge circuit 24 is identified by the specially assigned USID of 0x1, then the SuBUS slaves 26(1)-26(M) can only be identified by USIDs ranging from 0x2 to 0xF. Like the RFFE slaves 14(1)-14(N) as previously described in FIG. 1, the SuBUS slaves 26(1)-26(M) may also be accessed via BSID and GSID.

The SuBUS apparatus 22 may be employed to enable flexible heterogeneous bus deployment in an electronic device (e.g., a smartphone). However, as discussed above, the SuBUS apparatus 22 can only support up to 14 SuBUS slaves based on 14 USIDs. Furthermore, the number of SuBUS slaves that can be connected to the RFFE bus 16 may be further reduced if any of the 14 USIDs is used as a GSID. However, in some cases, it may be necessary to support more than 14 SuBUS slaves over the RFFE bus 16 in the electronic device. Accordingly, the RFFE specification further provides an option of having multiple RFFE buses and assigning RFFE slaves on separate RFFE buses with conflicting USIDs.

However, it may be challenging to incorporate additional RFFE buses in such space-constrained electronic devices as smartphones. First of all, to support each additional RFFE bus, the RFFE master 12 must provide two additional physical pins for connecting a data line like the data line 18 and a clock line like the clock line 20. This can be very difficult given that the RFFE master 12 can be a transceiver circuit that already has to provide a number of physical pins for connecting to a variety of components and/or circuits. Second, the RFFE master 12 and the SuBUS slaves 26(1)-26(M) may be located in different sections of an electronic device. For example, the RFFE master 12 can be located in a center of the electronic device, while the SuBUS bridge circuit 24 and/or the SuBUS slaves 26(1)-26(M) are placed close to edges of the electronic device. In this regard, it may be more complicated to make room for the additional RFFE bus and route the additional RFFE bus from the RFFE master 12 to the SuBUS bridge circuit 24 and/or the SuBUS slaves 26(1)-26(M). Hence, it may be desired to support more than 14 SuBUS slaves without adding an additional RFFE bus.

Figure 3:
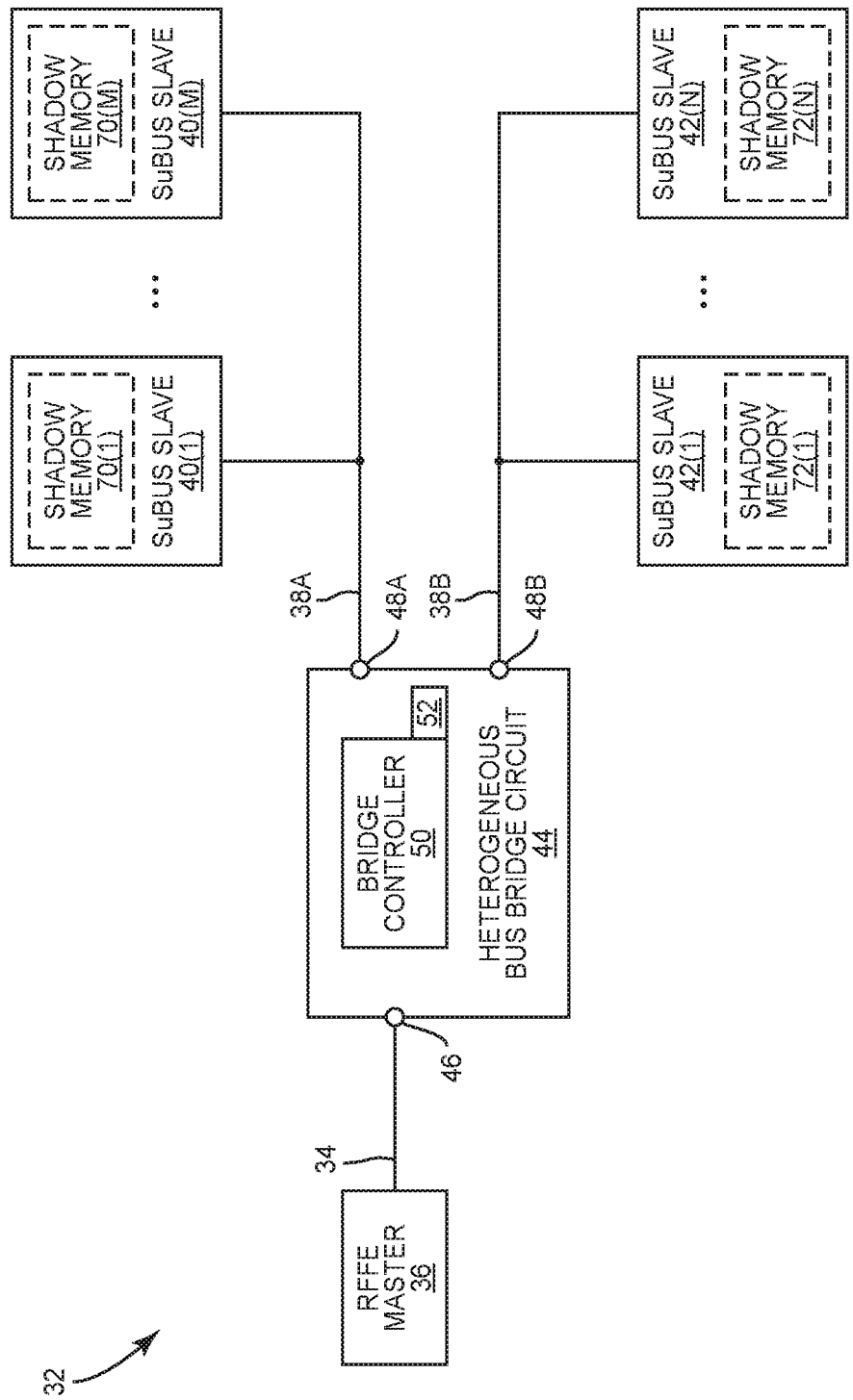
FIG. 3 is a schematic diagram of an exemplary apparatus configured according to an embodiment of the present disclosure to support more slaves than the RFFE bus structure of FIG. 1 and the SuBUS apparatus of FIG. 2.

In this regard, FIG. 3 is a schematic diagram of an exemplary apparatus 32 that can be configured according to an embodiment of the present disclosure to support more slaves than the RFFE bus structure 10 of FIG. 1 and the SuBUS apparatus 22 of FIG. 2. The apparatus 32 includes an RFFE bus 34 and an RFFE master 36 coupled to the RFFE bus 34. Like the RFFE bus 16 in FIG. 1, the RFFE bus 34 is a two-wire serial bus that includes a data line (not shown) and a clock line (not shown) for communicating a bidirectional data signal SDATA and a clock signal SCLK, respectively. The apparatus 32 includes at least one first auxiliary bus 38A and at least one second auxiliary bus 38B. In a non-limiting example, each of the first auxiliary bus 38A and the second auxiliary bus 38B is identical to the SuBUS 28 in FIG. 2.

The first auxiliary bus 38A can be configured to support a number of first slaves 40(1)-40(M) and the second auxiliary bus 38B can be configured to support a number of second slaves 42(1)-42(N). In a non-limiting example, the first slaves 40(1)-40(M) and the second slaves 42(1)-42(N) are SuBUS slaves like the SuBUS slaves 26(1)-26(M) in FIG. 2. Notably, the first auxiliary bus 38A and the second auxiliary bus 38B can be configured to support equal or different numbers of slaves (e.g., M=N, M>N, or M<N). Although the apparatus 32 is shown to include only the first auxiliary bus 38A and the second auxiliary bus 38B, it should be appreciated that the apparatus 32 can be configured to include additional auxiliary buses based on the configuration and operation principles described herein.

The apparatus 32 includes a heterogeneous bus bridge circuit 44 configured to bridge the RFFE bus 34 with the first auxiliary bus 38A and the second auxiliary bus 38B. The heterogeneous bus bridge circuit 44 is coupled to the RFFE bus 34, and thus the RFFE master 36, via a primary port 46. The heterogeneous bus bridge circuit 44 is also coupled to the first auxiliary bus 38A, and thus the first slaves 40(1)-40(M), via at least one first auxiliary port 48A. The heterogeneous bus bridge circuit 44 is further coupled to the second auxiliary bus 38B, and thus the second slaves 42(1)-42(N), via at least one second auxiliary port 48B.

The heterogeneous bus bridge circuit 44 can include a bridge controller 50, which can be a microprocessor, a microcontroller, or a field-programmable gate array (FPGA), for example. The bridge controller 50 can be configured to selectively activate at least one of the first auxiliary port 48A and the second auxiliary port 48B in response to receiving a predefined RFFE command sequence corresponding to the heterogeneous bus bridge circuit 44 and configured to identify at least one selected auxiliary bus among the first auxiliary bus 38A and the second auxiliary bus 38B for communication with the RFFE master 36.

Similar to the SuBUS bridge circuit 24 in FIG. 2, the heterogeneous bus bridge circuit 44 may be identified by a specially assigned USID (e.g., 0x1). In this regard, the predefined RFFE command sequence is associated with the heterogeneous bus bridge circuit 44 by including the specially assigned USID configured to identify the heterogeneous bus bridge circuit 44.

In a non-limiting example, the heterogeneous bus bridge circuit 44 can include a register map (REGMAP) 52 having at least one first control bit corresponding to the first auxiliary bus 38A and at least one second control bit corresponding to the second auxiliary bus 38B. In this regard, to configure the heterogeneous bus bridge circuit 44 to activate the first auxiliary bus 38A and deactivate the second auxiliary bus 38B, the RFFE master 36 may use the predefined RFFE command sequence to set the first control bit and the second control bit to binary value one (1) and zero (0), respectively. The bridge controller 50 may read the first control bit and the second control bit from the REGMAP 52. Accordingly, the bridge controller 50 may activate the first auxiliary port 48A coupled to the first auxiliary bus 38A and deactivate the second auxiliary port 48B coupled to the second auxiliary bus 38B, either concurrently or sequentially. Likewise, the RFFE master 36 may also use the predefined RFFE command sequence to set the first control bit and the second control bit to binary value 0 and 1, respectively, to deactivate the first auxiliary bus 38A and activate the second auxiliary bus 38B.

As mentioned earlier, the heterogeneous bus bridge circuit 44 is identified by the specially assigned USID (e.g., 0x1). As such, the first slaves 40(1)-40(M) and the second slaves 42(1)-42(N) are configured to share the remaining 14 USIDs ranging from 0x2 to 0xF. Accordingly, each of the first auxiliary bus 38A and the second auxiliary bus 38B can support up to fourteen slaves (e.g., SuBUS slaves). Thus, the first auxiliary bus 38A and the second auxiliary bus 38B may collectively support more slaves (e.g., up to twenty-eight) than allowed by the RFFE specification. Notably, it may be possible to support additional slaves by connecting additional auxiliary buses to the heterogeneous bus bridge circuit 44.

In this regard, the burden of providing additional physical pins by the RFFE master 36 may be lifted. As such, it may be possible to reduce the footprint of the RFFE master 36 and/or to reconfigure available physical pins for other purposes. In a non-limiting example, the heterogeneous bus bridge circuit 44 can be provided in close proximity to the first slaves 40(1)-40(M) and/or the second slaves 42(1)-42(N). By placing the heterogeneous bus bridge circuit 44 in close proximity to the first slaves 40(1)-40(M) and/or the second slaves 42(1)-42(N), each of the first slaves 40(1)-40(M) and/or the second slaves 42(1)-42(N) can have a shorter coupling distance to the heterogeneous bus bridge circuit 44 than to the RFFE master 36. As such, it may be possible to route the first auxiliary bus 38A and/or the second auxiliary bus 38B locally to the heterogeneous bus bridge circuit 44, thus helping to reduce design complexity of the apparatus 32.

Figure 4:
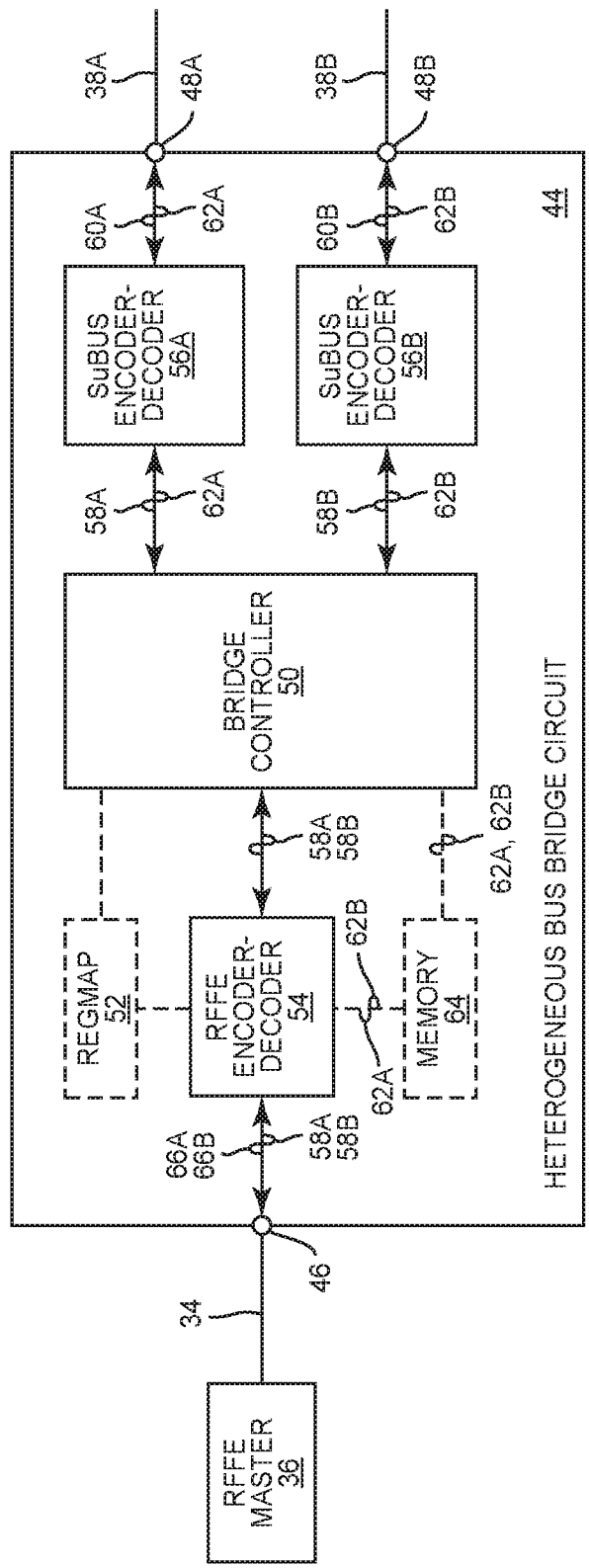
FIG. 4 is a schematic diagram providing an exemplary illustration of a heterogeneous bus bridge circuit in the apparatus of FIG. 3 configured according to an embodiment of the present disclosure.

FIG. 4 is a schematic diagram providing an exemplary illustration of the heterogeneous bus bridge circuit 44 of FIG. 3 configured according to an embodiment of the present disclosure. Common elements between FIGS. 3 and 4 are shown therein with common element numbers and will not be re-described herein.

The heterogeneous bus bridge circuit 44 can be configured to include a master encoder-decoder 54 (denoted as "RFFE Encoder-Decoder"), a first auxiliary encoder-decoder 56A (denoted as "SuBUS Encoder-Decoder"), and a second auxiliary encoder-decoder 56B (also denoted as "SuBUS Encoder-Decoder"). The master encoder-decoder 54 is coupled between the primary port 46 and the bridge controller 50. The first auxiliary encoder-decoder 56A is coupled between the bridge controller 50 and the first auxiliary port 48A. The second auxiliary encoder-decoder 56B is coupled between the bridge controller 50 and the second auxiliary port 48B.

The master encoder-decoder 54 may be configured to decode a first RFFE command sequence(s) 58A (e.g., register-write, register-read, register-poll, etc.) and a second RFFE command sequence(s) 58B (e.g., register-write, register-read, register-poll, etc.) received via the RFFE bus 34. The master encoder-decoder 54 may also be configured to decode the predefined RFFE command sequence corresponding to the heterogeneous bus bridge circuit 44 and configured to identify at least one selected auxiliary bus among the first auxiliary bus 38A and the second auxiliary bus 38B for communication with the RFFE master 36. Accordingly, the master encoder-decoder 54 may set the first control bit and the second control bit in the REGMAP 52 based on the predefined RFFE command sequence. Accordingly, the bridge controller 50 may selectively activate the first auxiliary port 48A and the second auxiliary port 48B based on the REGMAP 52.

The bridge controller 50 may forward the first RFFE command sequence(s) 58A and the second RFFE command sequence(s) 58B to the first auxiliary encoder-decoder 56A and the second auxiliary encoder-decoder 56B, respectively. The first auxiliary encoder-decoder 56A and the second auxiliary encoder-decoder 56B may be configured to convert the first RFFE command sequence(s) 58A and the second RFFE command sequence(s) 58B into a first SuBUS command sequence(s) 60A and a second SuBUS command sequence(s) 60B for communication via the first auxiliary bus 38A and the second auxiliary bus 38B, respectively.

The first auxiliary encoder-decoder 56A may be configured to decode a first SuBUS data payload(s) 62A received via the first auxiliary bus 38A and provide the first SuBUS data payload(s) 62A to the bridge controller 50. Likewise, the second auxiliary encoder-decoder 56B may be configured to decode a second SuBUS data payload(s) 62B received via the second auxiliary bus 38B and provide the second SuBUS data payload(s) 62B to the bridge controller 50. The bridge controller 50 may store the first SuBUS data payload(s) 62A and the second SuBUS data payload(s) 62B in a mirror memory 64 (denoted as "memory"). As previously mentioned, the first auxiliary bus 38A and the second auxiliary bus 38B may operate at the second data rate than the first data rate of the RFFE bus 34. As such, by storing the first SuBUS data payload(s) 62A and the second SuBUS data payload(s) 62B in the mirror memory 64, it may be possible to compensate for the difference between the first data rate and the second data rate.

The RFFE master 36 may communicate an RFFE register-read command sequence, for example in the first RFFE command sequence(s) 58A or the second RFFE command sequence(s) 58B, to the heterogeneous bus bridge circuit 44 to retrieve the first SuBUS data payload(s) 62A and/or the second SuBUS data payload(s) 62B stored in the mirror memory 64. In response to receiving the RFFE register-read command sequence, the bridge controller 50 may cause the master encoder-decoder 54 to encode the first SuBUS data payload(s) 62A and/or the second SuBUS data payload(s) 62B into a first RFFE data payload(s) 66A and/or a second RFFE data payload(s) 66B. Subsequently, the master encoder-decoder 54 may provide the first RFFE data payload(s) 66A and/or the second RFFE data payload(s) 66B to the RFFE master 36 via the RFFE bus 34.

Figure 5:
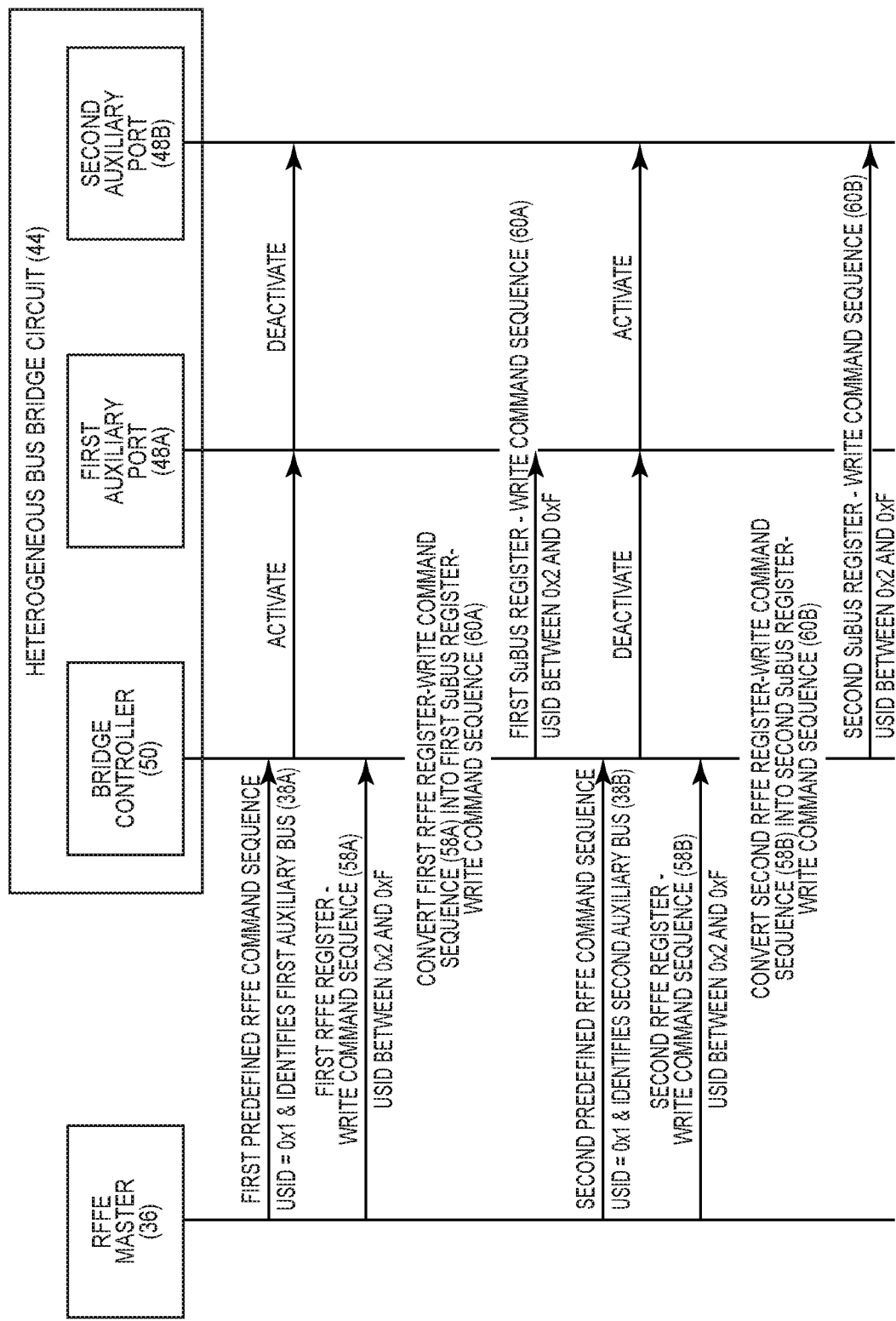
FIG. 5 is a flow diagram providing an exemplary illustration of the apparatus of FIG. 3 configured to write alternately to a pair of auxiliary buses.

Specific non-limiting working examples of the apparatus 32 of FIG. 3 are now discussed with reference to FIGS. 5-8B below. In this regard, FIG. 5 is a flow diagram 68 providing an exemplary illustration of the apparatus 32 of FIG. 3 configured to write alternately to the first auxiliary bus 38A and the second auxiliary bus 38B. Common elements between FIGS. 2 and 5 are shown therein with common element numbers and will not be re-described herein.

The bridge controller 50 is configured to receive a first predefined RFFE command sequence associated with the specially assigned USID (e.g., USID=0x1) and identifies the first auxiliary bus 38A for communication. As discussed above, the first predefined RFFE command sequence can cause the first control bit and the second control bit in the REGMAP 52 to be updated accordingly. Based on the first control bit and the second control bit in the REGMAP 52, the bridge controller 50 activates the first auxiliary port 48A and deactivates the second auxiliary port 48B. At this point, the bridge controller 50 is ready for the RFFE master 36 to communicate with any of the first slaves 40(1)-40(M) on the first auxiliary bus 38A.

Subsequently, the RFFE master 36 communicates a first RFFE register-write command sequence(s) 58A that identifies a selected first slave among the first slaves 40(1)-40(M) based on a USID (e.g., between 0x2 and 0xF). The bridge controller 50 may be configured to convert the first RFFE register-write command sequence(s) 58A into a first SuBUS register-write command sequence(s) 60A and provide the first SuBUS register-write command sequence(s) 60A to the first auxiliary port 48A.

The bridge controller 50 may then receive a second predefined RFFE command sequence associated with the specially assigned USID (e.g., USID=0x1) and identifies the second auxiliary bus 38B for communication. The second predefined RFFE command sequence can cause the first control bit and the second control bit in the REGMAP 52 to be updated accordingly. Based on the first control bit and the second control bit in the REGMAP 52, the bridge controller 50 activates the second auxiliary port 48B and deactivates the first auxiliary port 48A. At this point, the bridge controller 50 is ready for the RFFE master 36 to communicate with any of the second slaves 42(1)-42(N) on the second auxiliary bus 38B.

Subsequently, the RFFE master 36 communicates a second RFFE register-write command sequence(s) 58B that identifies a selected second slave among the second slaves 42(1)-42(N) based on a USID (e.g., between 0x2 and 0xF). The bridge controller 50 may be configured to convert the second RFFE register-write command sequence(s) 58B into a second SuBUS register-write command sequence(s) 60B and provide the second SuBUS register-write command sequence(s) 60B to the second auxiliary port 48B.

With reference back to FIG. 3, the first slaves 40(1)-40(M) may include first shadow memories 70(1)-70(M) for storing configuration parameters related to the first slaves 40(1)-40(M), respectively. Likewise, the second slaves 42(1)-42(N) may include second shadow memories 72(1)-72(N) for storing configuration parameters related to the second slaves 42(1)-42(N), respectively. As such, it may be possible to program the first shadow memories 70(1)-70(M)

and/or the second shadow memories 72(1)-72(N) via an RFFE register-write command sequence(s).

Figure 6:
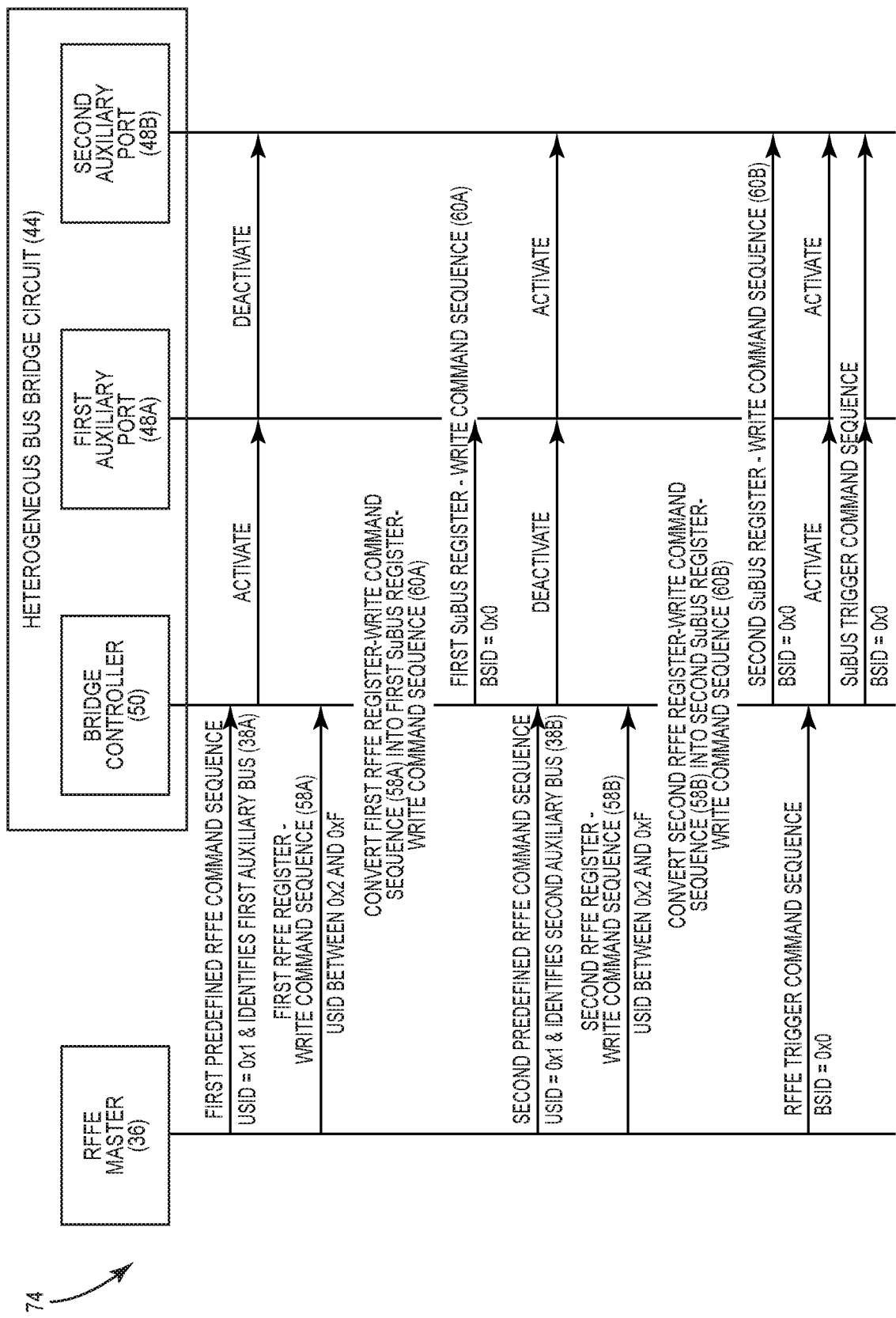
FIG. 6 is a flow diagram providing an exemplary illustration of the apparatus of FIG. 3 configured to write concurrently to a pair of auxiliary buses based on a broadcast slave identification (BSID)

In this regard, FIG. 6 is a flow diagram 74 providing an exemplary illustration of the apparatus 32 of FIG. 3 configured to write concurrently to the first auxiliary bus 38A and the second auxiliary bus 38B based on a BSID. Common elements between FIGS. 3 and 6 are shown therein with common element numbers and will not be re-described herein.

The bridge controller 50 is configured to receive a first predefined RFFE command sequence associated with the specially assigned USID (e.g., USID=0x1) and identifies the first auxiliary bus 38A for communication. As discussed above, the first predefined RFFE command sequence can cause the first control bit and the second control bit in the REGMAP 52 to be updated accordingly. Based on the first control bit and the second control bit in the REGMAP 52, the bridge controller 50 activates the first auxiliary port 48A and deactivates the second auxiliary port 48B. At this point, the bridge controller 50 is ready for the RFFE master 36 to communicate with any of the first slaves 40(1)-40(M) on the first auxiliary bus 38A.

Subsequently, the RFFE master 36 communicates a first RFFE register-write command sequence(s) 58A that identifies all of the first slaves 40(1)-40(M) based on a USID (e.g., between 0x2 and 0xF). The bridge controller 50 may be configured to convert the first RFFE register-write command sequence(s) 58A into a first SuBUS register-write command sequence(s) 60A and store the first SuBUS register-write command sequence(s) 60A in the first shadow memories 70(1)-70(M) via the first auxiliary port 48A.

The bridge controller 50 may then receive a second predefined RFFE command sequence associated with the specially assigned USID (e.g., USID=0x1) and identifies the second auxiliary bus 38B for communication. The second predefined RFFE command sequence can cause the first control bit and the second control bit in the REGMAP 52 to be updated accordingly. Based on the first control bit and the second control bit in the REGMAP 52, the bridge controller 50 activates the second auxiliary port 48B and deactivates the first auxiliary port 48A. At this point, the bridge controller 50 is ready for the RFFE master 36 to communicate with any of the second slaves 42(1)-42(N) on the second auxiliary bus 38B.

Subsequently, the RFFE master 36 communicates a second RFFE register-write command sequence(s) 58B that identifies all of the second slaves 42(1)-42(N) based on a USID (e.g., between 0x2 and 0xF). The bridge controller 50 may be configured to convert the second RFFE register-write command sequence(s) 58B into a second SuBUS register-write command sequence(s) 60B and store the second SuBUS register-write command sequence(s) 60B in the second shadow memories 72(1)-72(N) via the second auxiliary port 48B.

The bridge controller 50 may then receive an RFFE trigger command sequence(s) associated with the BSID from the RFFE master 36. In response to receiving the RFFE trigger command sequence(s), the bridge controller 50 is configured to both the first auxiliary port 48A and the second auxiliary port 48B. Subsequently, the bridge controller 50 may generate and provide a SuBUS trigger command sequence(s) associated with the BSID and provide the SuBUS trigger command sequence(s) to the first auxiliary port 48A and the second auxiliary port 48B concurrently. The SuBUS trigger command sequence(s) can cause the first slaves 40(1)-40(M) to be updated based on the first shadow memories 70(1)-70(M), respectively. Likewise, the SuBUS trigger command sequence(s) can cause the second slaves 42(1)-42(N) to be updated based on the second shadow memories 72(1)-72(N), respectively.

Figure 7:
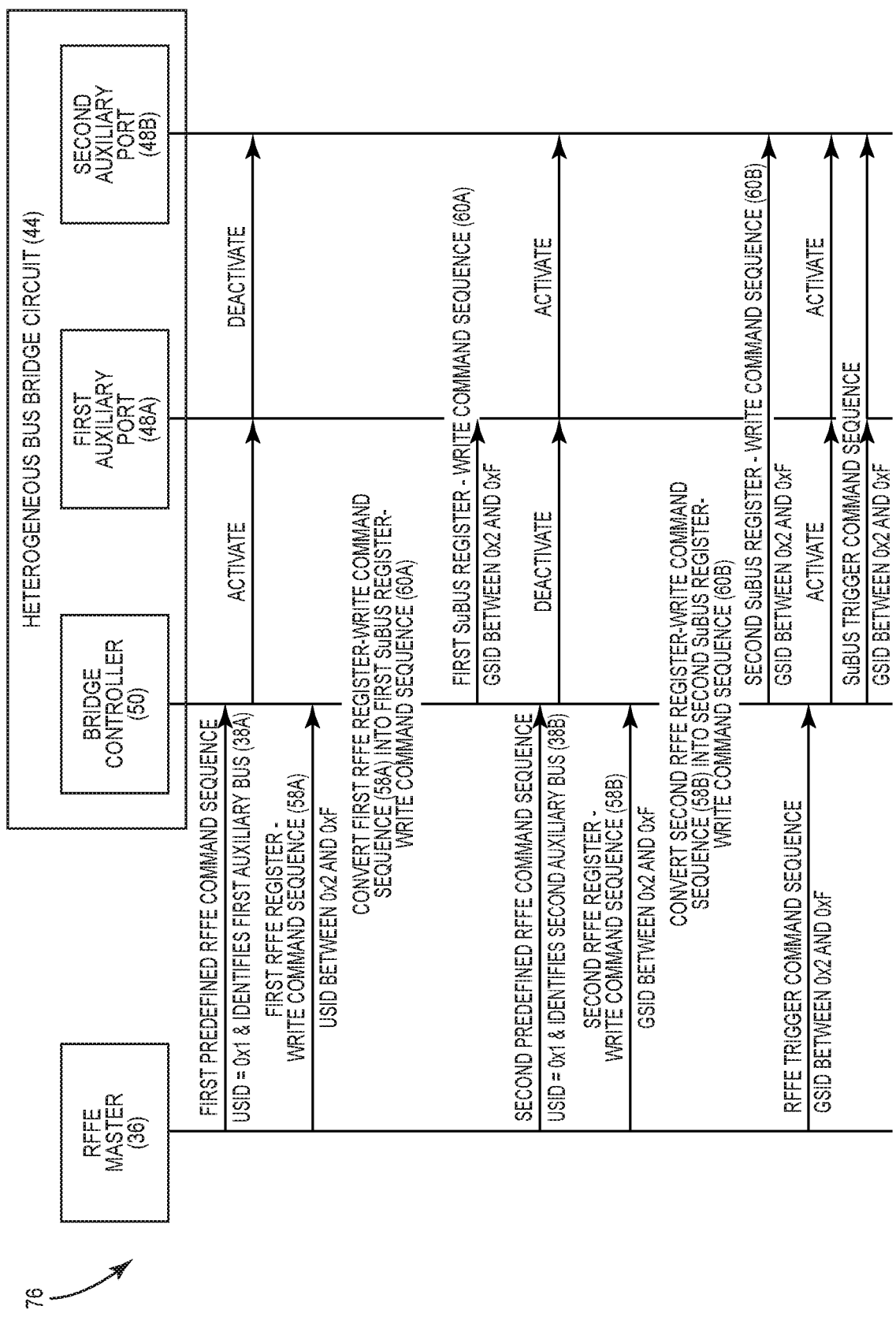
FIG. 7 is a flow diagram providing an exemplary illustration of the apparatus of FIG. 3 configured to write concurrently to a pair of auxiliary buses based on a group slave identification (GSID)

In contrast to updating all of the first slaves 40(1)-40(M) and all of the second slaves 42(1)-42(N) based on the RFFE trigger command sequence(s) associated with the BSID, it may also be possible to update some of the first slaves 40(1)-40(M) and/or some of the second slaves 42(1)-42(N) based on GSIDs. In this regard, FIG. 7 is a flow diagram 76 providing an exemplary illustration of the apparatus 32 of FIG. 3 configured to write concurrently to the first auxiliary bus 38A and the second auxiliary bus 38B based on a GSID. Common elements between FIGS. 3 and 7 are shown therein with common element numbers and will not be re-described herein.

The bridge controller 50 is configured to receive a first predefined RFFE command sequence associated with the specially assigned USID (e.g., USID=0x1) and identifies the first auxiliary bus 38A for communication. As discussed above, the first predefined RFFE command sequence can cause the first control bit and the second control bit in the REGMAP 52 to be updated accordingly. Based on the first control bit and the second control bit in the REGMAP 52, the bridge controller 50 activates the first auxiliary port 48A and deactivates the second auxiliary port 48B. At this point, the bridge controller 50 is ready for the RFFE master 36 to communicate with any of the first slaves 40(1)-40(M) on the first auxiliary bus 38A.

Subsequently, the RFFE master 36 communicates a first RFFE register-write command sequence(s) 58A that identifies one or more selected first slaves among the first slaves 40(1)-40(M) based on a USID (e.g., between 0x2 and 0xF). The bridge controller 50 may be configured to convert the first RFFE register-write command sequence(s) 58A into a first SuBUS register-write command sequence(s) 60A and store the first SuBUS register-write command sequence 60A in one or more selected shadow memories among the first shadow memories 70(1)-70(M) via the first auxiliary port 48A.

The bridge controller 50 may then receive a second predefined RFFE command sequence associated with the specially assigned USID (e.g., USID=0x1) and identifies the second auxiliary bus 38B for communication. The second predefined RFFE command sequence can cause the first control bit and the second control bit in the REGMAP 52 to be updated accordingly. Based on the first control bit and the second control bit in the REGMAP 52, the bridge controller 50 activates the second auxiliary port 48B and deactivates the first auxiliary port 48A. At this point, the bridge controller 50 is ready for the RFFE master 36 to communicate with any of the second slaves 42(1)-42(N) on the second auxiliary bus 38B.

Subsequently, the RFFE master 36 communicates a second RFFE register-write command sequence(s) 58B that identifies one or more selected second slaves among the second slaves 42(1)-42(N) based on a GSID (e.g., between 0x2 and 0xF). The bridge controller 50 may be configured to convert the second RFFE register-write command sequence(s) 58B into a second SuBUS register-write command sequence(s) 60B and store the second SuBUS register-write command sequence(s) 60B in one or more selected shadow memories among the second shadow memories 72(1)-72(N) via the second auxiliary port 48B.

The bridge controller 50 may then receive an RFFE trigger command sequence(s) associated with the GSID from the RFFE master 36. In response to receiving the RFFE trigger command sequence(s), the bridge controller 50 is configured to both the first auxiliary port 48A and the second auxiliary port 48B. Subsequently, the bridge controller 50 may generate and provide a SuBUS trigger command sequence(s) associated with the GSID and provide the SuBUS trigger command sequence to the first auxiliary port 48A and the second auxiliary port 48B concurrently. The SuBUS trigger command sequence(s) causes the selected first slaves to be updated based on the selected first shadow memories, respectively. Likewise, the SuBUS trigger command sequence(s) causes the selected second slaves to be updated based on the selected second shadow memories, respectively.

Figure 8A:
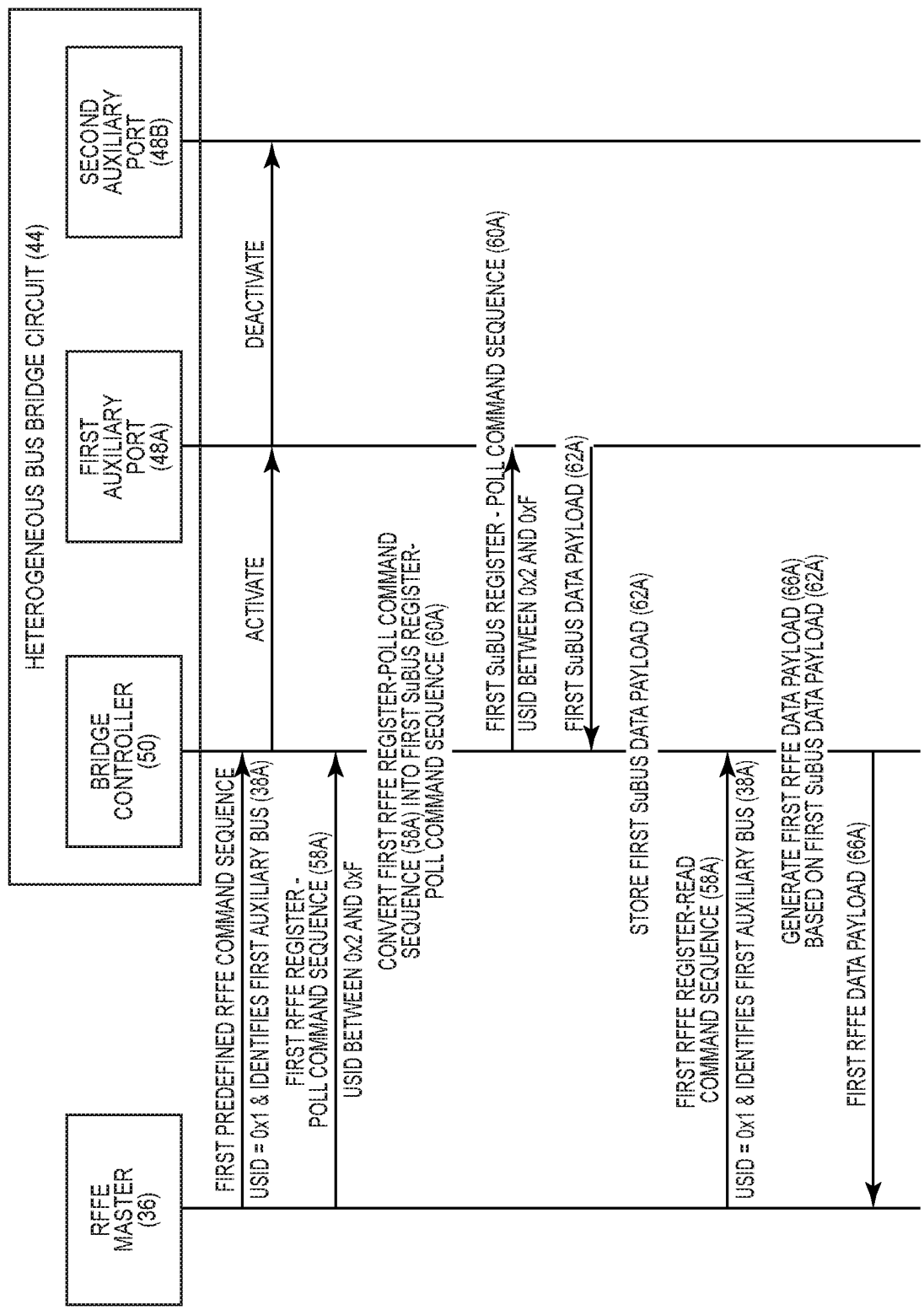
FIGS. 8A and 8B correspond to a flow diagram providing an exemplary illustration of the apparatus of FIG. 3 configured to read alternately from a pair of auxiliary buses.
Figure 8B:
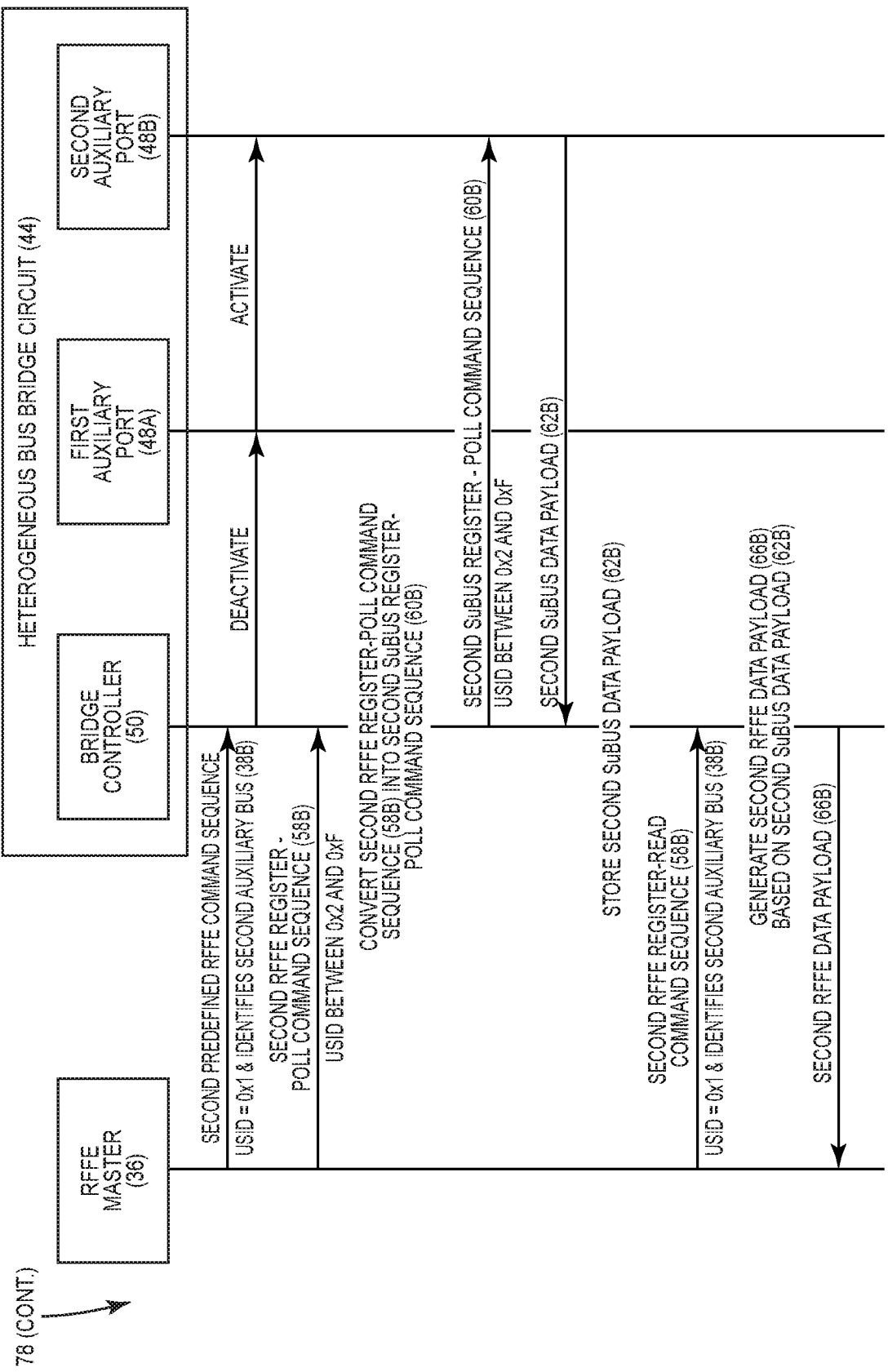

FIGS. 8A and 8B correspond to a flow diagram 78 providing an exemplary illustration of the apparatus 32 of FIG. 3 and FIG. 4 configured to read alternately from the first auxiliary bus 38A and the second auxiliary bus 38B. Common elements between FIGS. 3, 4, 8A, and 8B are shown therein with common element numbers and will not be re-described herein.

With reference to FIG. 8A, the bridge controller 50 receives a first predefined RFFE command sequence associated with the specially assigned USID (e.g., USID=0x1) and identifies the first auxiliary bus 38A for communication. As discussed above, the first predefined RFFE command sequence can cause the first control bit and the second control bit in the REGMAP 52 to be updated accordingly. Based on the first control bit and the second control bit in the REGMAP 52, the bridge controller 50 activates the first auxiliary port 48A and deactivates the second auxiliary port 48B. At this point, the bridge controller 50 is ready for the RFFE master 36 to communicate with any of the first slaves 40(1)-40(M) on the first auxiliary bus 38A.

Subsequently, the RFFE master 36 communicates a first RFFE register-poll command sequence(s) 58A that identifies a selected first slave among the first slaves 40(1)-40(M) based on a USID (e.g., between 0x2 and 0xF). The bridge controller 50 may be configured to convert the first RFFE register-poll command sequence(s) 58A into a first SuBUS register-poll command sequence(s) 60A and provide the first SuBUS register-poll command sequence(s) 60A to the first auxiliary port 48A.

The selected first slave may then provide a first SuBUS data payload(s) 62A to the bridge controller 50 via the first auxiliary port 48A. The bridge controller 50 may store the first SuBUS data payload(s) 62A in the mirror memory 64. Subsequently, the RFFE master 36 may provide a first RFFE register-read command sequence(s) 58A to the bridge controller 50. In response, the bridge controller 50 generates a first RFFE data payload(s) 66A based on the first SuBUS data payload(s) 62A stored in the mirror memory 64. Subsequently, the bridge controller 50 may provide the first RFFE data payload(s) 66A to the RFFE master 36.

With reference to FIG. 8B, the bridge controller 50 receives a second predefined RFFE command sequence associated with the specially assigned USID (e.g., USID=0x1) and identifies the second auxiliary bus 38B for communication. As discussed above, the second predefined RFFE command sequence can cause the first control bit and the second control bit in the REGMAP 52 to be updated accordingly. Based on the first control bit and the second control bit in the REGMAP 52, the bridge controller 50 activates the second auxiliary port 48B and deactivates the first auxiliary port 48A. At this point, the bridge controller 50 is ready for the RFFE master 36 to communicate with any of the second slaves 42(1)-42(N) on the second auxiliary bus 38B.

Subsequently, the RFFE master 36 communicates a second RFFE register-poll command sequence(s) 58B that identifies a selected second slave among the second slaves 42(1)-42(N) based on a USID (e.g., between 0x2 and 0xF). The bridge controller 50 may be configured to convert the second RFFE register-poll command sequence(s) 58B into a second SuBUS register-poll command sequence(s) 60B and provide the second SuBUS register-poll command sequence(s) 60B to the second auxiliary port 48B.

The selected second slave may then provide a second SuBUS data payload(s) 62B to the bridge controller 50 via the second auxiliary port 48B. The bridge controller 50 may store the second SuBUS data payload(s) 62B in the mirror memory 64. Subsequently, the RFFE master 36 may provide a second RFFE register-read command sequence(s) 58B to the bridge controller 50. In response, the bridge controller 50 generates a second RFFE data payload(s) 66B based on the second SuBUS data payload(s) 62B stored in the mirror memory 64. Subsequently, the bridge controller 50 may provide the second RFFE data payload(s) 66B to the RFFE master 36.

Those skilled in the art will recognize improvements and modifications to the embodiments of the present disclosure. All such improvements and modifications are considered within the scope of the concepts disclosed herein and the claims that follow.

What is claimed is:

1. A heterogeneous bus bridge circuit comprising:
a primary port coupled to a radio frequency front-end (RFFE) master via an RFFE bus;
at least one first auxiliary port coupled to at least one first slave via at least one first auxiliary bus;
at least one second auxiliary port coupled to at least one second slave via at least one second auxiliary bus; and
a bridge controller configured to:
receive a predefined RFFE command sequence comprising a unique slave identification (USID) identifying the heterogeneous bus bridge circuit and an indication that is different from the USID and uniquely identifies at least one selected auxiliary bus among the at least one first auxiliary bus and the at least one second auxiliary bus for communication with the RFFE master; and
activate at least one selected auxiliary port coupled to the at least one selected auxiliary bus among the at least one first auxiliary port and the at least one second auxiliary port in response to receiving the predefined RFFE command sequence.

2. The heterogeneous bus bridge circuit of claim 1, wherein the USID identifying the heterogeneous bus bridge circuit is a specially assigned USID between hexadecimal value one (0x1) and hexadecimal value fifteen (0xF), wherein the bridge controller is further configured to activate the at least one selected auxiliary port in response to receiving the predefined RFFE command sequence comprising the specially assigned USID.

3. The heterogeneous bus bridge circuit of claim 2 wherein each of the at least one first auxiliary bus and the at least one second auxiliary bus is configured to support a plurality of USIDs between hexadecimal value one (0x1) and hexadecimal value fifteen (0xF) excluding the specially assigned USID.

4. The heterogeneous bus bridge circuit of claim 1 wherein:
the RFFE bus is configured to communicate RFFE command sequences and data payloads at a first data rate; and each of the at least one first auxiliary bus and the at least one second auxiliary bus comprises a single-wire bus (SuBUS) configured to communicate SuBUS command sequences and data payloads at a second data rate different from the first data rate.

5. The heterogeneous bus bridge circuit of claim 4 wherein the bridge controller is further configured to:
receive an RFFE register-write command sequence via the primary port;
convert the RFFE register-write command sequence to a SuBUS register-write command sequence; and
provide the SuBUS register-write command sequence to the at least one selected auxiliary port.

6. The heterogeneous bus bridge circuit of claim 4 wherein the bridge controller is further configured to:
receive an RFFE register-poll command sequence via the primary port;
convert the RFFE register-poll command sequence into a SuBUS register-poll command sequence;
provide the SuBUS register-poll command sequence to the at least one selected auxiliary port;
receive at least one SuBUS data payload via the at least one selected auxiliary port; and
store the at least one SuBUS data payload received via the at least one selected auxiliary port.

7. The heterogeneous bus bridge circuit of claim 6 wherein the bridge controller is further configured to:
receive an RFFE register-read command sequence corresponding to the heterogeneous bus bridge circuit;
generate at least one RFFE data payload based on the at least one stored SuBUS data payload; and
provide the at least one RFFE data payload to the primary port.

8. The heterogeneous bus bridge circuit of claim 7 wherein the bridge controller is further configured to store the at least one SuBUS data payload prior to generating the at least one RFFE data payload to compensate for a difference between the first data rate and the second data rate.

9. An apparatus comprising:
a radio frequency front-end (RFFE) bus and an RFFE master coupled to the RFFE bus;
at least one first auxiliary bus and a plurality of first slaves coupled to the at least one first auxiliary bus;
at least one second auxiliary bus and a plurality of second slaves coupled to the at least one second auxiliary bus; and
a heterogeneous bus bridge circuit comprising:
a primary port coupled to the RFFE master via the RFFE bus;
at least one first auxiliary port coupled to the plurality of first slaves via the at least one first auxiliary bus;
at least one second auxiliary port coupled to the plurality of second slaves via the at least one second auxiliary bus; and
a bridge controller configured to:
receive a predefined RFFE command sequence comprising a unique slave identification (USID) identifying the heterogeneous bus bridge circuit and comprising an indication that is different from the USID and uniquely identifies at least one selected auxiliary bus among the at least one first auxiliary bus and the at least one second auxiliary bus for communication with the RFFE master; and
activate at least one selected auxiliary port coupled to the at least one selected auxiliary bus among the at least one first auxiliary port and the at least one second auxiliary port in response to receiving the predefined RFFE command sequence.

10. The apparatus of claim 9 wherein:
the USID identifying the heterogeneous bus bridge circuit is a specially assigned USID between hexadecimal value one (0x1) and hexadecimal value fifteen (0xF); and
the bridge controller is further configured to activate the at least one selected auxiliary port in response to receiving the predefined RFFE command sequence comprising the specially assigned USID.

11. The apparatus of claim 10 wherein each of the at least one first auxiliary bus and the at least one second auxiliary bus is configured to support a plurality of USIDs between hexadecimal value one (0x1) and hexadecimal value fifteen (0xF) excluding the specially assigned USID.

12. The apparatus of claim 9 wherein:
the RFFE bus is configured to communicate RFFE command sequences and data payloads at a first data rate; and
each of the at least one first auxiliary bus and the at least one second auxiliary bus comprises a single-wire bus (SuBUS) configured to communicate SuBUS command sequences and data payloads at a second data rate different from the first data rate.

13. The apparatus of claim 12 wherein the bridge controller is further configured to:
receive a first predefined RFFE command sequence corresponding to the heterogeneous bus bridge circuit and configured to identify the at least one first auxiliary bus for communication with the RFFE master;
activate the at least one first auxiliary port and deactivate the at least one second auxiliary port;
receive at least one first RFFE register-write command sequence corresponding to a selected first slave among the plurality of first slaves;
convert the at least one first RFFE register-write command sequence into at least one first SuBUS register-write command sequence corresponding to the selected first slave; and
provide the at least one first SuBUS register-write command sequence to the at least one first auxiliary port.

14. The apparatus of claim 13 wherein the bridge controller is further configured to:
receive a second predefined RFFE command sequence corresponding to the heterogeneous bus bridge circuit and configured to identify the at least one second auxiliary bus for communication with the RFFE master;
activate the at least one second auxiliary port and deactivate the at least one first auxiliary port;
receive at least one second RFFE register-write command sequence via the primary port corresponding to a selected second slave among the plurality of second slaves;
convert the at least one second RFFE register-write command sequence into at least one second SuBUS register-write command sequence corresponding to the selected second slave; and
provide the at least one second SuBUS register-write command sequence to the at least one second auxiliary port.

15. The apparatus of claim 12 wherein the bridge controller is further configured to:
receive a first predefined RFFE command sequence corresponding to the heterogeneous bus bridge circuit and configured to identify the at least one first auxiliary bus for communication with the RFFE master;
activate the at least one first auxiliary port and deactivate the at least one second auxiliary port;
receive at least one first RFFE register-write command sequence corresponding to the plurality of first slaves;
convert the at least one first RFFE register-write command sequence into at least one first SuBUS register-write command sequence corresponding to the plurality of first slaves;
store the at least one first SuBUS register-write command sequence in the plurality of first slaves via the at least one first auxiliary port;
receive a second predefined RFFE command sequence corresponding to the heterogeneous bus bridge circuit and configured to identify the at least one second auxiliary bus for communication with the RFFE master;
activate the at least one second auxiliary port and deactivate the at least one first auxiliary port;
receive at least one second RFFE register-write command sequence corresponding to the plurality of second slaves;
convert the at least one second RFFE register-write command sequence into at least one second SuBUS register-write command sequence corresponding to the plurality of second slaves; and
store the at least one second SuBUS register-write command sequence in the plurality of second slaves via the at least one second auxiliary port.

16. The apparatus of claim 15 wherein the bridge controller is further configured to:
receive an RFFE trigger command sequence corresponding to a broadcast slave identification (BSID);
convert the RFFE trigger command sequence into a SuBUS trigger command sequence corresponding to the BSID;
activate the at least one first auxiliary port and the at least one second auxiliary port; and
provide concurrently the SuBUS trigger command sequence to the plurality of first slaves and the plurality of second slaves via the at least one first auxiliary port and the at least one second auxiliary port, respectively.

17. The apparatus of claim 12 wherein the bridge controller is further configured to:
receive a first predefined RFFE command sequence corresponding to the heterogeneous bus bridge circuit and configured to identify the at least one first auxiliary bus for communication with the RFFE master;
activate the at least one first auxiliary port and deactivate the at least one second auxiliary port;
receive at least one first RFFE register-write command sequence corresponding to one or more selected first slaves among the plurality of first slaves;
convert the at least one first RFFE register-write command sequence into at least one first SuBUS register-write command sequence corresponding to the one or more selected first slaves;
store the at least one first SuBUS register-write command sequence in the one or more selected first slaves via the at least one first auxiliary port;
receive a second predefined RFFE command sequence corresponding to the heterogeneous bus bridge circuit and configured to identify the at least one second auxiliary bus for communication with the RFFE master;
activate the at least one second auxiliary port and deactivate the at least one first auxiliary port;
receive at least one second RFFE register-write command sequence corresponding to one or more selected second slaves among the plurality of second slaves;
convert the at least one second RFFE register-write command sequence into at least one second SuBUS register-write command sequence corresponding to the one or more selected second slaves; and
store the at least one second SuBUS register-write command sequence in the one or more selected second slaves via the at least one second auxiliary port.

18. The apparatus of claim 17 wherein the bridge controller is further configured to:
receive an RFFE trigger command sequence corresponding to a group slave identification (GSID) associated with the one or more selected first slaves and the one or more selected second slaves;
convert the RFFE trigger command sequence into a SuBUS trigger command sequence corresponding to the GSID;
activate the at least one first auxiliary port and the at least one second auxiliary port; and
provide concurrently the SuBUS trigger command sequence to the one or more selected first slaves and the one or more selected second slaves via the at least one first auxiliary port and the at least one second auxiliary port, respectively.

19. The apparatus of claim 12 wherein the bridge controller is further configured to:
receive a first predefined RFFE command sequence corresponding to the heterogeneous bus bridge circuit and configured to identify the at least one first auxiliary bus for communication with the RFFE master;
activate the at least one first auxiliary port and deactivate the at least one second auxiliary port;
receive at least one first RFFE register-poll command sequence corresponding to a selected first slave among the plurality of first slaves;
convert the at least one first RFFE register-poll command sequence into at least one first SuBUS register-poll command sequence corresponding to the selected first slave;
provide the at least one first SuBUS register-poll command sequence to the selected first slave via the at least one first auxiliary port;
receive at least one first SuBUS data payload from the selected first slave via the at least one first auxiliary port and store the at least one first SuBUS data payload;
receive a first RFFE register-read command sequence corresponding to the heterogeneous bus bridge circuit;
convert the at least one stored first SuBUS data payload into at least one first RFFE data payload; and
provide the at least one first RFFE data payload to the RFFE master via the primary port.

20. The apparatus of claim 19 wherein the bridge controller is further configured to:
receive a second predefined RFFE command sequence corresponding to the heterogeneous bus bridge circuit and configured to identify the at least one second auxiliary bus for communication with the RFFE master;
activate the at least one second auxiliary port and deactivate the at least one first auxiliary port;
receive at least one second RFFE register-poll command sequence corresponding to a selected second slave among the plurality of second slaves;

convert the at least one second RFFE register-poll command sequence into at least one second SuBUS register-poll command sequence corresponding to the selected second slave;
provide the at least one second SuBUS register-poll command sequence to the selected second slave via the at least one second auxiliary port;
receive at least one second SuBUS data payload from the selected second slave via the at least one second auxiliary port and store the at least one second SuBUS data payload;
receive a second RFFE register-read command sequence corresponding to the heterogeneous bus bridge circuit;
convert the at least one stored second SuBUS data payload into at least one second RFFE data payload; and
provide the at least one second RFFE data payload to the RFFE master via the primary port.

* * * * *